(12) United States Patent
Weiner et al.

(10) Patent No.: US 7,142,789 B1
(45) Date of Patent: Nov. 28, 2006

(54) METHODS AND APPARATUS FOR GENERATING A RADIATION PULSE SEQUENCE

(75) Inventors: Andrew Marc Weiner, West Lafayette, IN (US); Daniel E. Leaird, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 819 days.

(21) Appl. No.: 10/188,293

(22) Filed: Jul. 2, 2002

Related U.S. Application Data

(60) Provisional application No. 60/304,358, filed on Jul. 10, 2001.

(51) Int. Cl.
*H04B 10/04* (2006.01)
(52) U.S. Cl. ...................... 398/201; 398/189
(58) Field of Classification Search ............ 398/81–88, 398/201, 189
See application file for complete search history.

(56) References Cited

U.S. PATENT DOCUMENTS

| | | | |
|---|---|---|---|
| 4,655,547 A | | 4/1987 | Heritage et al. |
| 5,923,683 A | * | 7/1999 | Morioka et al. ............... 372/6 |
| 6,577,782 B1 | | 6/2003 | Leaird et al. |
| 6,608,945 B1 | * | 8/2003 | Deliwala ....................... 385/2 |

FOREIGN PATENT DOCUMENTS

WO WO-01/25849 A2 4/2001

OTHER PUBLICATIONS

Adar, R., et al., "Broad-Band Array Multiplexers Made With Silica Waveguides on Silicon", *Journal of Lightwave Technology*, 11(2), (1993), 212-219.
Colombeau, B., et al., "Shaping of Short Laser Pulses by Passive Optical Fourier Techniques", *Optics Communications*, 19(2), (1976), 201-204.
Emplit, P., et al., "Passive Amplitude and Phase Picosecond Pulse Shaping", *Optics Letters*, 17(19), (1992), 1358-1360.
Emplit, P., et al., "Picosecond Dark Soliton Over a 1-km Fiber at 850 nm", *Optics Letters*, 18(13), (1993), 1047-1049.
Emplit, P., et al., "Picosecond Steps and Dark Pulses Through Nonlinear Single Mode Fibers", *Optics Communications*, 62(6), (1987), 374-379.

(Continued)

*Primary Examiner*—Leslie Pascal
(74) *Attorney, Agent, or Firm*—Schwegman, Lundberg, Woessner & Kluth, P.A.

(57) ABSTRACT

Methods and apparatus or generating a radiation pulse sequence are disclosed. One embodiment of the apparatus includes two coupled direct space-to-time pulse generators (DSTPGs) with a channel operation element (COE) in between. The first DSTPG forms multiple spatially separated radiation pulse sequences. The COE operates to modify one or more of the radiation pulse sequences, such as imparting a time delay between them. The modified radiation pulse sequences are then combined by the second DSTPG to form a single output radiation pulse sequence.

41 Claims, 12 Drawing Sheets

OTHER PUBLICATIONS

Leaird, D. E., et al., "1 THz Repetition Rate Multichannel Pulse Train Source Using an Arrayed Waveguide Grating", *Optical Fiber Communication Conference and Exhibit (OFC 2001)*, vol. 3, (2001), WP1-1—WP1-3.

Leaird, D. E., et al., "1 THz Repetition Rate WDM Pulse Train Generation From an Arrayed-Waveguide Grating", *Conference on Lasers and Electro-Optics (CLEO 2000)*, (2000), 693-694.

Leaird, D. E., et al., "Chirp Control in the Direct Space-to-Time Pulse Shaper", *Optics Letters*, 25(11), (2000), 850-852.

Leaird, D. E., et al., "Direct Space-to-Time Conversion for Ultrafast Optical Waveform Generation", *Conference on Lasers and Electro-Optics (CLEO '98), OSA Technical Digest*, (1998), 99-100.

Leaird, D. E., et al., "Direct Space-to-Time Pulse Shaper / Arrayed Waveguide Grating Analogy for High Repetition Rate WDM Pulse Train Generation", *Ultrafast Optics and Optoelectronics, OSA Technical Digest*, (2001), 6-8.

Leaird, D. E., et al., "Double-Passed Arrayed Waveguide Grating for 500-GHz Pulse Burst Generation", *IEEE Photonics Technology Letters*, 14(10), (2002), 1451-1453.

Leaird, D. E., et al., "Femtosecond Direct Space-to-Time Pulse Shaping", *IEEE Journal of Quantum Electronics*, 37(4), (2001), 494-504.

Leaird, D. E., et al., "Femtosecond Optical Packet Generation by a Direct Space-to-Time Pulse Shaper", *Optics Letters*, 24(12), (1999), 853-855.

Leaird, D. E., et al., "Femtosecond Pulse Sequence Processing Using a Double-Passed Arrayed Waveguide Grating", *Conference on Lasers and Electro-Optics (CLEO 2002), Technical Digest*, (2002), 114-115.

Leaird, D. E., et al., "Generation of Flat-Topped 500-GHz Pulse Bursts Using Loss Engineered Arrayed Waveguide Gratings", *IEEE Photonics Technology Letters*, 14(6), (2002), 816-818.

Leaird, D. E., et al., "Generation of High Repetition Rate Pulse Bursts via Femtosecond Readout of a Double-Passed Arrayed Waveguide Grating", *Optical Fiber Communication Conference and Exhibit (OFC 2002)*, (2002), 664-665.

Leaird, D. E., et al., "Generation of High-Repetition-Rate WDM Pulse Trains From an Arrayed-Waveguide Grating", *IEEE Photonics Technology Letters*, 13(3), (2001), 221-223.

Leaird, D. E., et al., "High Repetition Rate Femtosecond WDM Pulse Generation Using Direct Space-to-Time Pulse Shapers and Arrayed Waveguide Meetings", *Optical and Quantum Electronics*, 33, (2001), 811-826.

Leaird, D. E., et al., "High Repetition Rate Flat-Topped Pulse Trains From an Arrayed Waveguide Grating", *Conference on Laser and Electro-Optics (CLEO 2001), Technical Digest*, (2001), 187-188.

Leaird, D. E., et al., "Loss Engineered Arrayed Waveguide Gratings for Generating Multiple Wavelength Shifted 500 GHz Repetition Rate Flat-Topped Pulse Trains", *The 14th Meeting of the IEEE Lasers and Electro-Optics Society (LEOS 2001)*, vol. 2, (2001), 843-844.

Okamoto, K., "Recent Progress of Integrated Optics Planar Lightwave Circuits", *Optical and Quantum Electronics*, 31, (1999), 107-129.

Sauteret, C., et al., "Passive Pulse Shaping by Spectral Narrowing of Picosecond Pulses", *Applied Optics*, 20(8), (1981), 1487-1490.

Weiner, A. M., "Femtosecond Optical Pulse Shaping and Processing", *Progress in Quantum Electronics*, 19, (1995), 161-237.

Weiner, A. M., et al., "Picosecond and Femtosecond Fourier Pulse Shape Synthesis", *Revue Phys. Appl.* 22, (1987), 1619-1628.

Weiner, A. M., et al., "Very High Speed Pulse Sequence Generation via Femtosecond Read-Out of Arrayed Waveguide Gratings", *Integrated Photonics Research*, (Jul. 2002), IThG4-1—IThG4-2.

\* cited by examiner

METHODS AND APPARATUS FOR GENERATING A RADIATION PULSE SEQUENCE

RELATED APPLICATION

This application claims priority under 35 U.S.C. 119(e) from U.S. Provisional Application Ser. No. 60/304,358 filed Jul. 10, 2001, which application is incorporated herein by reference.

GOVERNMENT LICENSING RIGHTS

The U.S. Government has a paid-up license in this invention and the right, in limited circumstances, to require the patent owner to license others on reasonable terms as provided for by the terms of contract No. DAAD19-00-1-0497 awarded by the Army Research Office.

TECHNICAL FIELD

The technical field of the invention relates to methods and apparatus for generating a radiation pulse sequence.

BACKGROUND INFORMATION

Communication systems such as microwave systems and optical networks operating at ultra-high speeds (e.g., 100 gigabits per second (Gb/s) and greater) require a source for creating a train (sequence) of high repetition rate pulses of radiation. One approach for creating a sequence of such pulses is to perform time division multiplexing (TDM) of multiple pulse sources operating at relatively low repetition rates. In such an approach, precise timing of the relative delays for each pulse source is required.

International Patent Application No. WO 01/25849 A2, entitled "Direct Space-to-Time Pulse Shaper and Optical Pulse Train Generator," which application is incorporated by reference herein, describes methods and systems for creating a high repetition rate pulse train using a direct space-to-time pulse generator, abbreviated hereinafter as "DSTPG." A DSTPG is an apparatus that employs a spectral dispersing element (SDE) to spectrally disperse a single pulse of radiation to create multiple spatially separated sequences of radiation pulses. The spectral dispersing element may be, for example, a diffraction grating or an arrayed waveguide grating (AWG).

FIG. 1A is a plan view of an AWG 10. An AWG is a passive element that spectrally disperses light by virtue of an array of waveguides having different lengths and thus the ability to impart different phases to light inputted therein at one end of the waveguides. The AWG includes at least one input waveguide 12, an input slab waveguide 14 coupled to the input waveguide, an array 18 of waveguides 20 each having a different length and input ends 22 coupled to the input slab waveguide, an output slab waveguide 26 coupled to the waveguide array, and one or more output waveguides 32 coupled to the output slab waveguide. Output waveguides 32 each have an input end 36.

In AWG 10, a radiation pulse 40 enters input slab waveguide 14 from input waveguide 12 and spreads to input end 22 of waveguide array 18. The waveguide array acts as a combined lens and diffraction grating. Further, input slab waveguide 14 and ends 22 serve to spatially pattern the radiation.

Radiation pulse 40 excites pulses 42 that travel over each waveguide 20 in waveguide array 18. Pulses 42 are temporally separated by the delay increment per waveguide associated with the different length of the waveguides 20.

Radiation pulses 42 then enter second slab waveguide 26 and spectrally disperse to input ends 36 of output waveguides 32. The output waveguides act as multiple slits in that the spatial location of input ends 36 of output waveguides 32 serves to select particular wavelengths. Because of their ability to spectrally disperse and combine radiation, AWGs are commonly used in the art of optical telecommunications to multiplex and demultiplex signals.

FIG. 1B is a plan view of a modified AWG 10', which is also described in International Patent Application No. WO 01/25849 A2. Modified AWG 10' is similar to AWG 10, but further includes one or more waveguide operation elements (WOEs) 43 incorporated into waveguide array 18 to operate on radiation pulses 42 to form modified radiation pulses 42'. In one example, the WOEs 43 provide a fixed waveguide loss into some or all of waveguides 20. By incorporating different losses into different waveguides, the AWG can function as a DSTPG to produce an output radiation pulse sequence that is equal-amplitude (i.e., flat-topped). When the non-modified AWG 10 is used as DSTPG, it generally produces an output radiation pulse sequence that varies in amplitude.

The use of such fixed waveguide loss for generating a substantially equal amplitude output radiation pulse sequence has been described in the article by D. E. Leaird, A. M. Weiner, S. Kamei, M. Ishii, A. Sugita, and K. Okamoto, "Generation of Flat-Topped 500 GHz Pulse Bursts Using Loss Engineered Arrayed Waveguide Gratings," IEEE Photon. Tech Lett. 14, 816–818, (2002), which article is incorporated by reference herein.

Other examples of WOEs include modifying the phase in at least one of the guides, modifying the delay in at least one of the guides, controlling or modifying the polarization in at least one of the guides, or providing amplification in at least one of the guides. In general, the WOEs are used to modify the output radiation pulse sequence produced by the DSTPG. Furthermore, WOEs 43 may be either fixed, as in a series of one or more fixed waveguide losses, or programmable, as in a series of intensity modulators.

A DSTPG can yield multiple spatially separate sequences of radiation pulses with identical temporal intensity profiles but varying center wavelength. However, having a multitude of such radiation pulse sequences on different channels is not always desired. Rather, what is often desired is a single sequence of high repetition rate radiation pulses.

SUMMARY OF THE INVENTION

A first aspect of the invention is an apparatus that includes a first direct space-to-time pulse generator (DSTPG) capable of receiving an input radiation pulse and forming therefrom a multitude of spatially separated radiation pulse sequences. A channel operation element (COE) is coupled to the first DSTPG to receive the multitude of radiation pulse sequences. The COE is also adapted to perform an operation on one or more of the multitude of radiation pulse sequences to form corresponding modified radiation pulse sequences. A second is DSTPG coupled to the COE and is capable of receiving and combining the modified radiation pulse sequences to form a single output radiation pulse sequence.

A second aspect of the invention is a method that includes spectrally dispersing a single radiation pulse, thereby forming a multitude of spatially separated radiation pulse sequences. The method further includes performing an operation on at least one of the multitude of radiation pulse sequences to form a corresponding multitude of modified radiation pulse sequences. The method also includes forming an output radiation pulse sequence by spectrally combining the modified radiation pulse sequences.

Figure 1A:
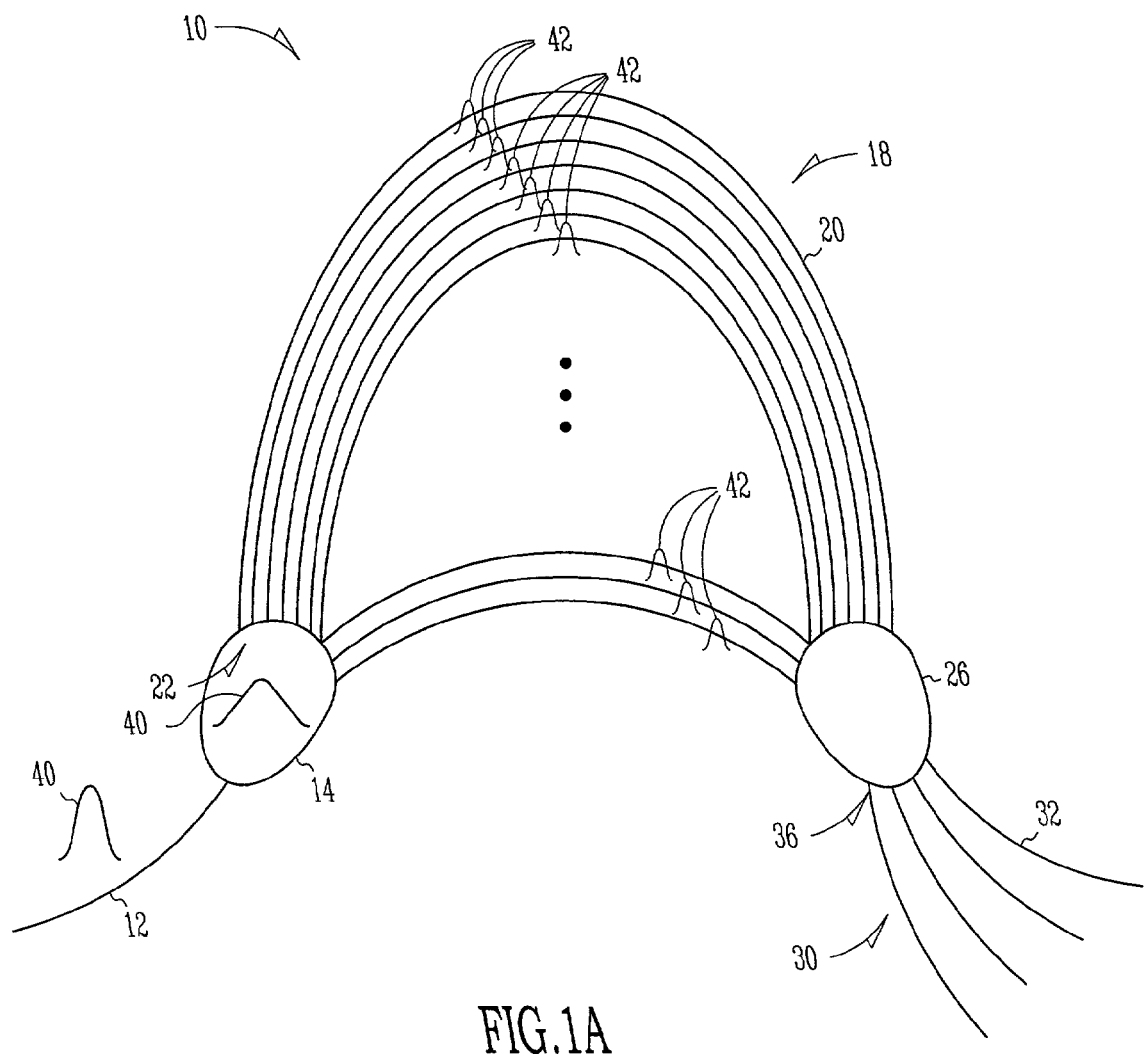
FIG. 1A is a plan view of a prior art arrayed waveguide grating (AWG)

The various elements depicted in the drawings are merely representational and are not drawn to scale. Certain proportions thereof may be exaggerated, while others may be minimized. The drawings are intended to illustrate various implementations of the invention, which can be understood and appropriately carried out by those of ordinary skill in the art.

Further, like elements are given the same reference numbers in different Figures.

DETAILED DESCRIPTION

In the following detailed description of the embodiments of the invention, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

In the description that follows, a overview of a general embodiment of a radiation pulse sequence generator apparatus of the present invention is first provided. An integrated optical embodiment of the apparatus is also discussed for the sake of illustration. Then, the elements making up the apparatus are discussed in detail. The method of operation of the apparatus is then presented, followed by examples of output radiation pulse sequences that can be formed by the apparatus. Specific example embodiments of the apparatus are then discussed, followed by example embodiments of telecommunications systems and methods of the present invention that employ the radiation pulse sequence generator apparatus.

Apparatus Overview

Figure 1B:
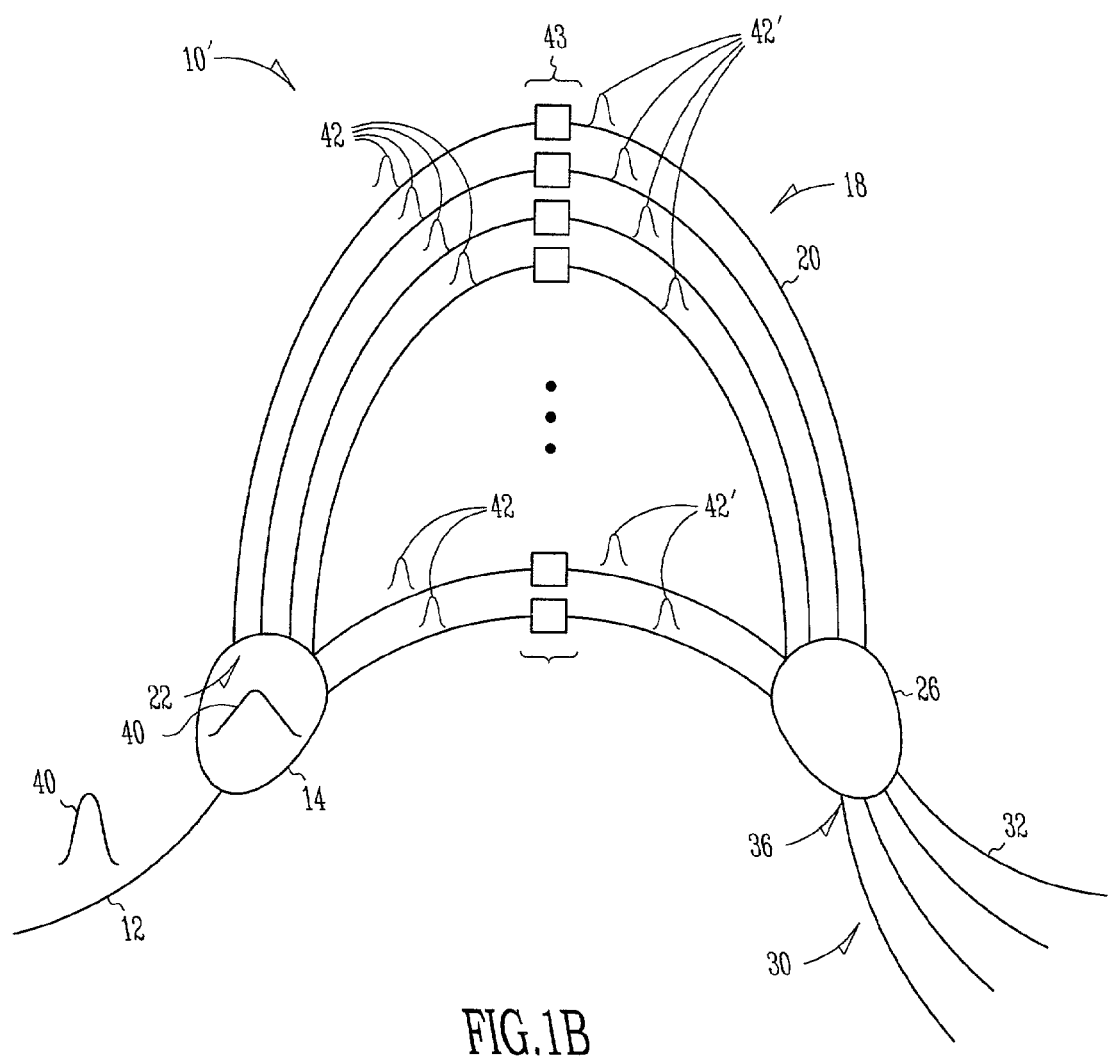
FIG. 1B is a plan view of a prior art AWG similar to that of FIG. 1A, but that includes one or more waveguide operation elements (WOEs) in the waveguide array.
Figure 2A:
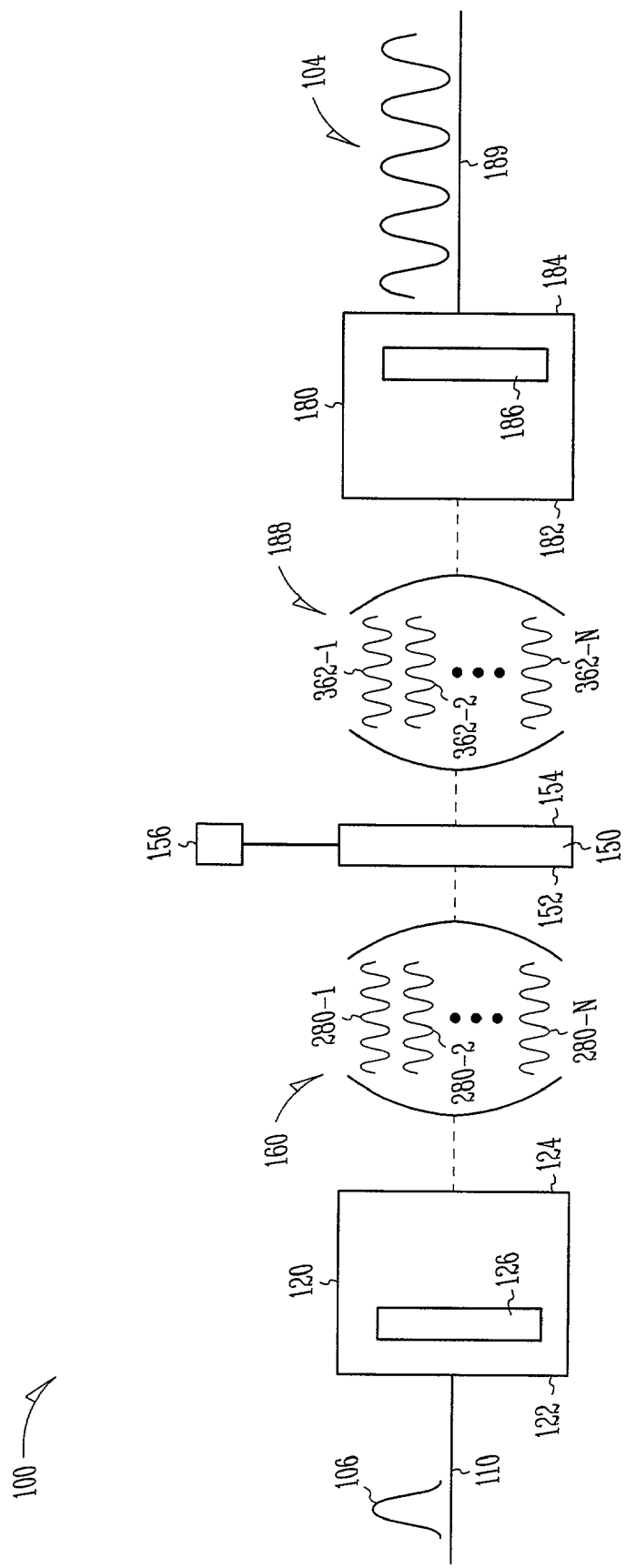
FIG. 2A is a schematic diagram of a generalized embodiment of the radiation pulse sequence generation apparatus of the present invention.

FIG. 2A is a schematic diagram of a generalized embodiment of an radiation pulse sequence generator apparatus 100 capable of generating a single output radiation pulse sequence 104 from a single input radiation pulse 106. Apparatus 100 includes at least one input channel 110 coupled to a direct space-to-time pulse generator (DSTPG) 120. DSTPG 120 has an input end 122, an output end 124, and a spectral dispersing element (SDE) 126. SDE 126 may be, for example, a diffraction grating, an arrayed waveguide grating (AWG) (e.g., such as AWG 10 of FIG. 1A or AWG 10' of FIG. 1B), a virtual image phased array (VIPA), an echelle grating, or any combination thereof.

Apparatus 100 also includes a channel operation element (COE) 150 having an input end 152 and an output end 154. In an example embodiment, COE is operably connected to a controller 156 that controls the operation of the COE. COE 150 is optically coupled to output end 124 of DSTPG 120 via an optical system 160.

In an example embodiment, the optical coupling between DSTPG 120 and COE 150 is performed in free space, with optical system 160 comprising conventional bulk optical elements (i.e., lenses, prisms, mirrors, etc.).

Figure 2B:
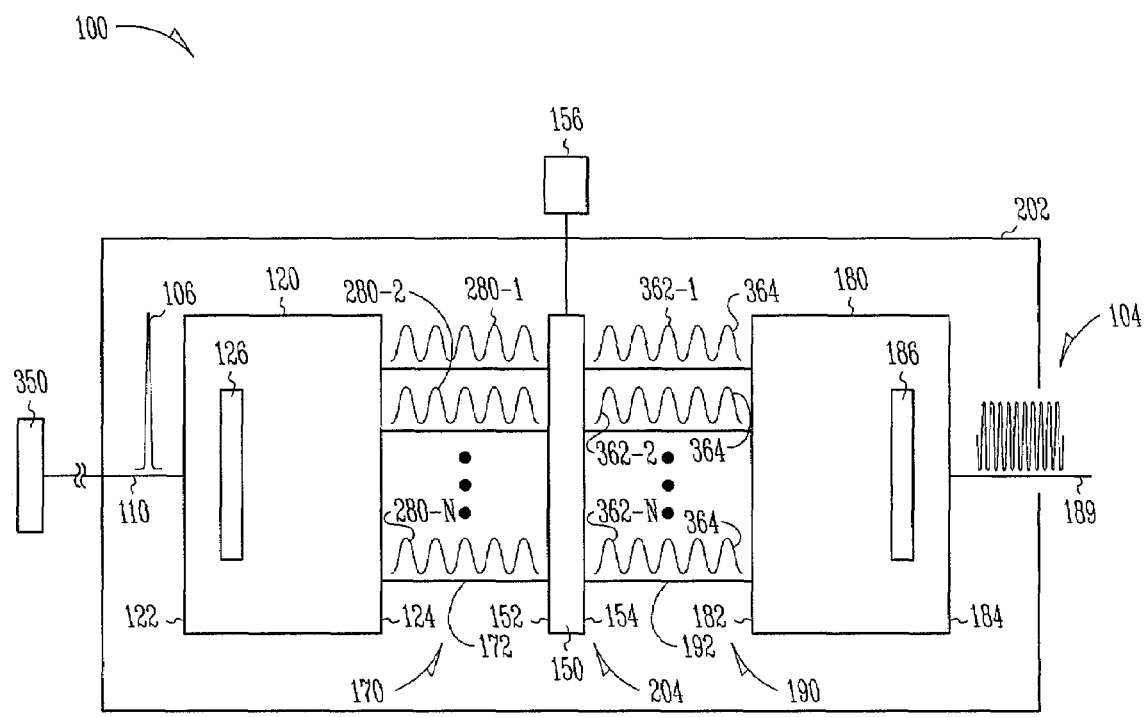
FIG. 2B is a schematic diagram of an example integrated optical embodiment of the apparatus of FIG. 2A.

FIG. 2B is a schematic diagram of an example integrated optical embodiment of apparatus 100 of FIG. 2A. With reference to FIGS. 2A and 2B, optical system 160 includes in an example embodiment an array 170 of waveguides 172, which is coupled to the COE at input end 152 and to DSTPG 120 at output end 124.

With reference again to FIG. 2A, apparatus 100 also includes a second DSTPG 180 having an input end 182, an output end 184, and an SDE 186. SDE 186 may be, for example, a diffraction grating, an arrayed waveguide grating (AWG), a virtual image phased array (VIPA), an echelle grating, or any combination thereof.

DSTPG 180 is optically coupled to output end 154 of COE 150 via optical system 188. In an example embodiment, the optical coupling between DSTPG 180 and COE 150 is performed in free space using optical system 188, which in an example embodiment is made up of conventional bulk optical elements (i.e., lenses, prisms, mirrors, etc.). Connected to output end 184 of DSTPG 180 is an output channel 189.

With reference again to FIG. 2B, in another example embodiment, optical system 188 includes an array 190 of waveguides 192 coupled to the DSTPG at input end 182 and to the COE at output end 154. Further in the example embodiment, output channel 189 is a waveguide.

In another example embodiment, apparatus 100 is made of bulk optical elements (as opposed to integrated optical elements). Further in the example embodiment waveguides 172 and 192 are either optical fibers or free-space beams.

In the example embodiment illustrated in FIG. 2B, input channel 110 is an input waveguide connected to input end 122 of DSTPG 120. Further in the example embodiment, apparatus 100 is fabricated on a single substrate 202 as a planar lightwave circuit (PLC) 204. In PLC 204, waveguides 172 of waveguide array 170 and/or waveguides 192 making up waveguide array 190 may be, for example, channel waveguides formed in or on substrate 202.

Example Embodiments of the DSTPGs

As mentioned above, a DSTPG, as the term is used herein, is an apparatus that employs an SDE to spectrally disperse a single pulse of radiation to create multiple spatially separated sequences of radiation pulses. Various embodiments of DSTPGs 120 and/or DSTPG 180 may be used in radiation pulse sequence generation apparatus 100 and its various embodiments. For the sake of simplicity, the example DSTPGs discussed below will be referred to as DSTPG 120, though it will be understood that they can equally serve as DSTPG 180.

Figure 3:
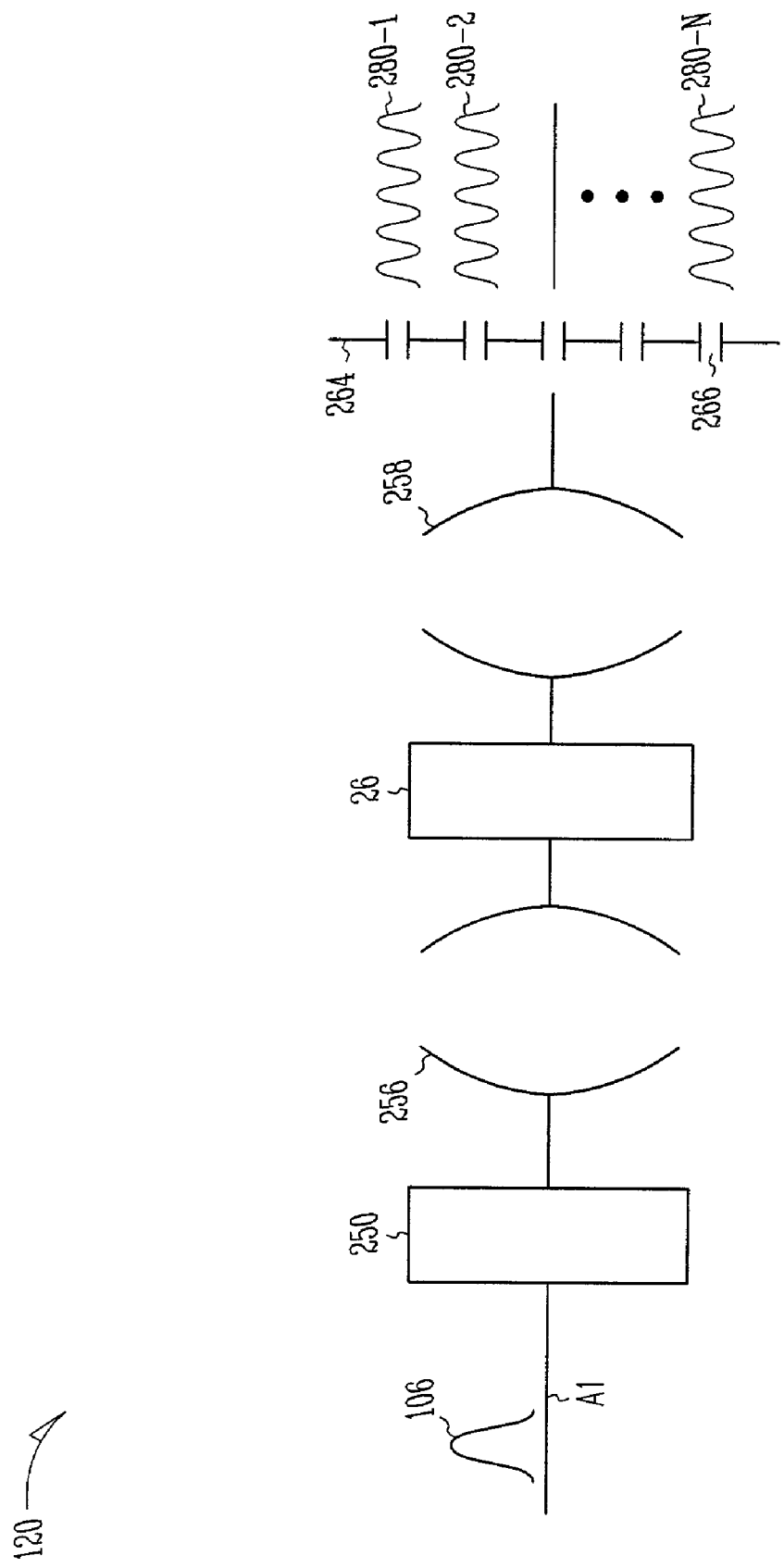
FIG. 3 is a schematic diagram of an example of a direct space-to-time pulse generator (DSTPG) for use in the radiation pulse sequence generation apparatus of the present invention.

FIG. 3 is an example embodiment of DSTPG 120, which is described in detail in International Patent Application No. WO 01/25849 A2. DSTPG 120 comprises, in order along an optical axis A1, a spatial light modulator 250 for spatially modulating input pulse 106, first relay optics 256, an SDE 126 for spectrally dispersing the radiation, second relay optics 258, and an output port 264 having multiple apertures 266 for outputting select multiple radiation pulse sequences 280-1, 280-2, . . . 280-n. Many variations of the example embodiment of DSTPG 120 of FIG. 3 are possible, as will be apparent to those skilled in the art. For example, DSTPG 120 may consist solely of SDE 126.

With reference again to FIG. 1A, further in the example embodiment, SDE 126 includes an AWG 10 with a relatively small free spectral range (FSR), i.e., less than the bandwidth of the input pulse. The FSR is defined herein as the inverse of the delay increment per waveguide 20 in waveguide array 18. When AWGs are used as channel multiplexers/demultiplexers in optical communications networks, a large FSR (i.e., greater than the bandwidth of the input pulse) is required to ensure that a unique optical frequency band is present at each AWG output.

In the present invention, a small FSR is called for because it is preferred that individual pulses within the radiation pulse sequences exiting the AWG do not completely overlap. With reference again to FIG. 1A, in an example embodiment, the delay increment $\Delta\tau$ per waveguide 20 is longer than the (temporal) pulse length $\Delta t$ of input radiation pulse 40. For example, if input pulse 40 has a pulse length $\Delta t=200$ femtoseconds, then an acceptable delay increment $\Delta\tau$ is about 1 to 2 picoseconds.

Example Embodiments of the COE

With reference again to FIGS. 2A and 2B, COE 150 performs one or more of a number of parallel operations on one or more channels (i.e., radiation pulse sequences 280-1, 280-2, . . . 280-n) associated with the output of DSTPG 120. Examples of operations performed by COE 150 include one or more of: imparting relative time delays, attenuating one or more channels, amplifying one or more channels, modifying the phase of (i.e., imparting a phase shift to) one or more channels, switching, modifying the polarization state of one or more channels, and modulating one or more channels.

In one example embodiment, COE element 150 is fixed, i.e., non-programmable. Examples of a fixed COE 150 include an attenuator array, an array of birefringent elements, or a time-delay waveguide array.

In another example embodiment, COE 150 is programmable. Examples of a programmable COE 150 include an addressable and/or programmable phase modulator array, an addressable and/or programmable array of elements for imparting a time-delay, an addressable and/or programmable attenuator, and an addressable and/or programmable intensity modulator. Where COE 150 is programmable, the COE is controlled, in an example embodiment, by controller 156. Controller 156 is, in an example embodiment, a microprocessor with software capable of carrying out select instructions, such as providing activation or deactivation of addressible members (not shown) making up COE 150.

Figure 4:
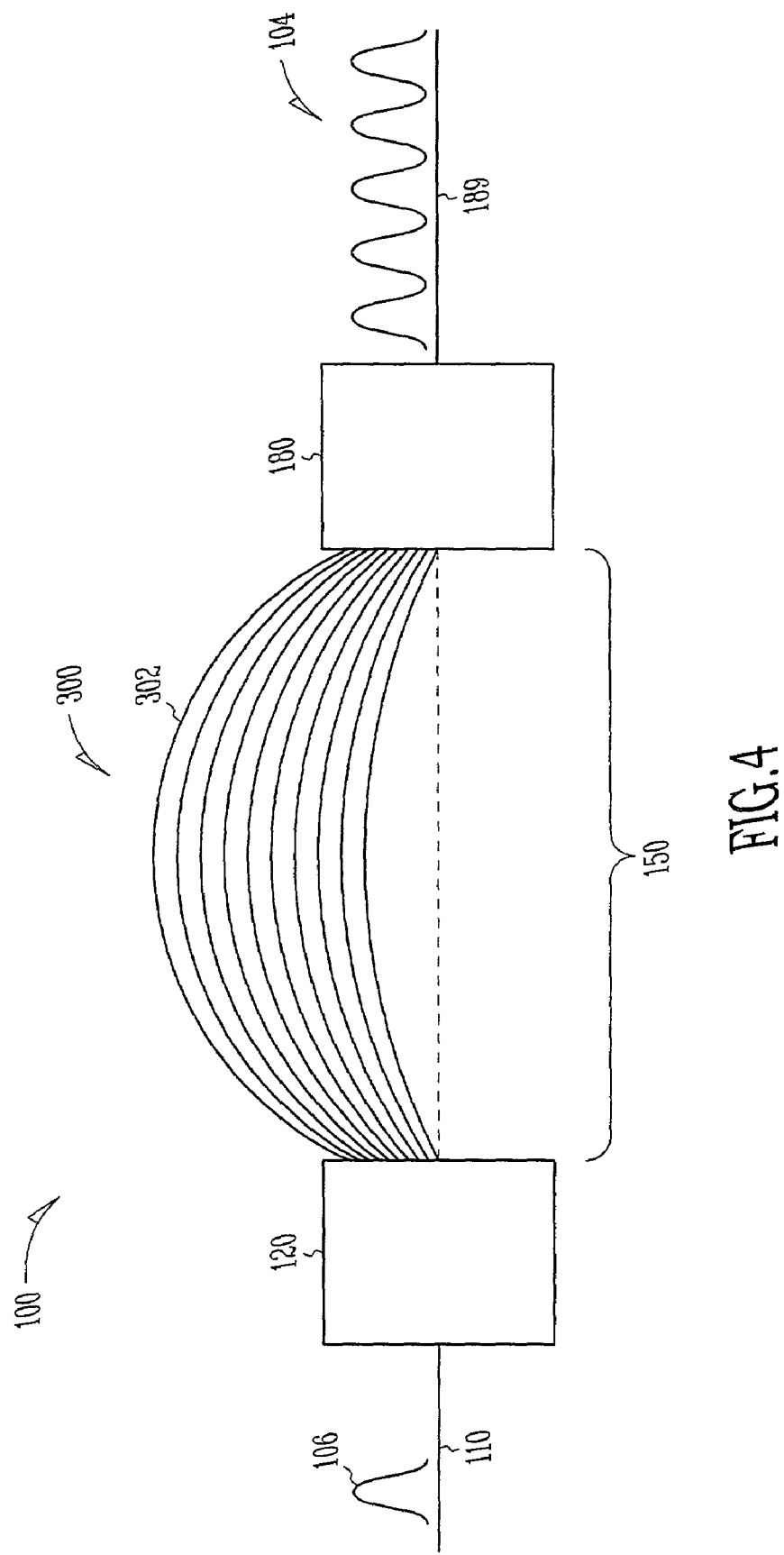
FIG. 4 is a schematic diagram of an example embodiment of the apparatus of FIG. 1, wherein the channel operation element (COE) includes a set of time-delay waveguides.

With reference now to FIG. 4, there is shown an example embodiment of apparatus 100 in which the COE 150 includes an array 300 of time-delay waveguides 302 connecting DSTPG 120 to DSTPG 180. Array 300 can be thought of as a combination of waveguides 172 and waveguides 192 of apparatus 100 shown in FIG. 2B. Waveguides 302 each have a different length corresponding to a select time delay $\Delta T$. In an example embodiment of the apparatus 100 of FIG. 4, DSTPG 120 and DSTPG 180 are AWGs arranged back-to-back.

Method of Operation

The operation of apparatus 100 is now described with reference to FIGS. 2A and 2B

Radiation pulse 106 is provided by a light source 350 coupled to input channel 110. In an example embodiment, light source 350 includes a laser. In other example embodiments, light source 350 includes a fiber laser or a laser diode. Further in an example embodiment, input channel 110 includes at least one waveguide.

Radiation pulse 106 enters DSTPG 120 via input channel 110 and is spectrally dispersed by SDE 126. The dispersed pulse is then spatially sampled to form multiple radiation pulse sequences 280-1, 280-2 . . . , 280-n, each having different spatial location at output end 124, and a different center wavelength. Radiation pulse sequences 280-1, 280-2, . . . 280-n correspond to different channels of DSTPG 120.

In the example embodiment of FIG. 2B, waveguides 172 are arranged to receive one each of radiation pulse sequences 280-1, 280-2, . . . 280-n.

Radiation pulse sequences 280-1, 280-2, . . . 280-n are then transmitted by optical system 160 (e.g., by waveguides 172) and inputted to COE 150 at input end 152.

COE 150 then performs one or more of a number of the aforementioned operations (e.g., time delay, switching, phase modulation, amplitude modulation, and polarization modulation) on one or more of radiation pulse sequences (channels) 280-1, 280-2, . . . 280-n.

The one or more operations performed by COE 150 on radiation pulse sequences 280-1, 280-2, . . . 280-n result in the formation of modified radiation pulse sequences 362-1, 362-2, . . . 362-n. For ease of terminology, all of the radiation pulse sequences 362-1, 362-2, . . . 362-n are all referred to as being "modified," even though only one or more of the radiation pulse sequences 280 may be operated upon by COE 150. Also, each modified radiation pulse sequence is considered to be made up of individual pulses 364, though strictly speaking the different pulses within a given sequence may not be identical.

It is assumed in the discussion that follows, for the sake of illustration only, that the operation performed by COE 150 is a time-delay, such as may be accomplished by the COE 150 illustrated in apparatus 100 of FIG. 4. In this case, the modified (i.e., time delayed) radiation pulse sequences 362-1, 362-2, . . . 362-n are then transmitted by optical system 188 (e.g., by corresponding waveguides 192; FIG. 2B) to DSTPG 180.

DSTPG 180 serves to combine the different modified radiation pulse sequences 362-1, 362-2, . . . . 362-n to form output radiation pulse sequence 104. The latter is inputted to and carried by output channel 189. Without the benefit of the time delays imparted to radiation pulse sequences 280-1, 280-2, . . . 280-n, DSTPG 180 would combine the unmodified pulse sequences atop of one another. However, because of the imparted time delays, modified radiation pulse sequences 362-1, 362-2, . . . 362-n can be combined in a number of different ways to form a variety of radiation pulse sequences, as discussed below.

By combining two DSTPGs as described above, a very high repetition rate (e.g., 100 GHz and above) output pulse sequence 104 can be generated on a single output channel with very low optical power loss. When the two DSTPGs have the same FSR, center wavelength, and number of channels, the "wavelengths" spectrally sliced by DSTPG 120 are recombined by DSTPG 180, ideally with no loss.

Example Output Radiation Pulse Sequences

In an example embodiment, the DSTPGs 120 and 180 are designed to create a select or desired output radiation pulse sequence 104. For example, in one embodiment, the DSTPGs are designed to provide non-equal-amplitude modified radiation pulse sequences 362-1, 362-2, . . . 362-n. While in another example embodiment, the modified radiation pulse sequences are equal-amplitude (i.e., flat-topped).

In another example embodiment, a range of time delays is provided by COE 150 to create one of a number of different types of output radiation pulse sequences.

Figure 5A:
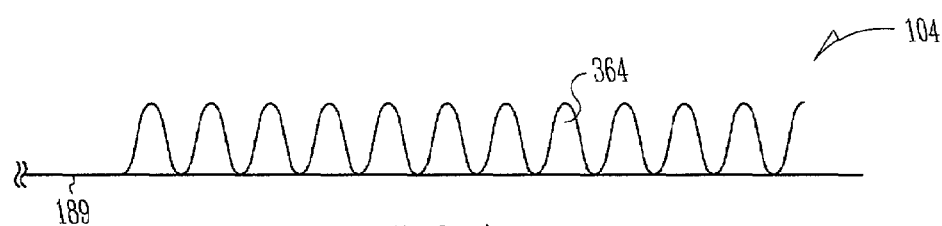
FIG. 5A illustrates an example embodiment of a continuous output radiation pulse sequence.

FIG. 5A illustrates an example embodiment wherein a continuous output radiation pulse sequence 104 is formed by COE 150 operating to providing time delays $\tau_1, \tau_2 \ldots \tau_n$ to corresponding radiation pulse sequences 280-1, 280-2, . . . 280-n, such that when the modified radiation pulse sequences 362-1, 362-2, . . . 362-n are combined, the resulting output radiation pulse sequence has no gaps between the individual pulses 364.

Figure 5B:
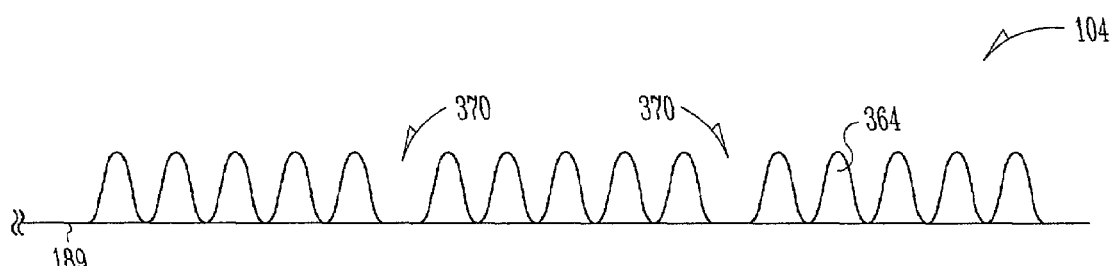
FIG. 5B illustrates an example embodiment of an output radiation pulse sequence with at least one gap between select pulse sequences.

FIG. 5B illustrates an example embodiment wherein a broken output radiation pulse sequence 104 is formed by COE 150 operating to providing time delays $\tau_1, \tau_2, \ldots \tau_n$ to corresponding radiation pulse sequences 280-1, 280-2, . . . 280-n, such that when the modified radiation pulse sequences 362-1, 362-2, . . . 362-n are combined, the resulting output radiation pulse sequence 104 has at least one gap 370 between select pulse sequences.

Figure 5C:
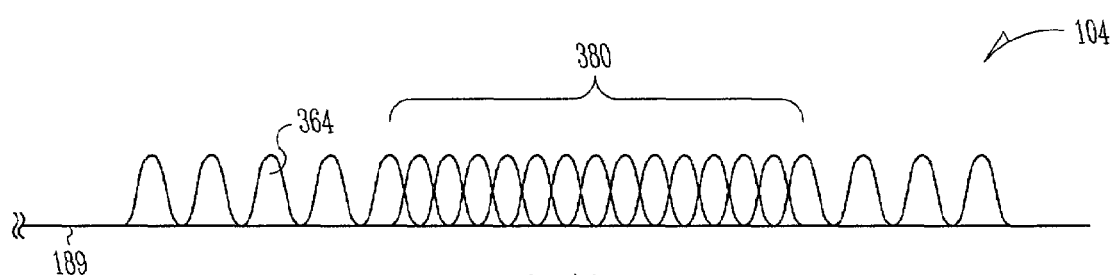
FIG. 5C illustrates an example embodiment of output radiation pulse sequence wherein at least a portion has of the sequence has a higher frequency than the remaining portion.

FIG. 5C illustrates an example embodiment wherein output radiation pulse sequence 104 includes at least a portion 380 having a higher pulse rate (e.g., double the frequency) than any single modified radiation pulse sequence 362-1, 362-2, . . . 362-n, or remaining portion of the output radiation pulse sequence. This is accomplished, for example, by COE 150 operating to provide time delays $\tau_1, \tau_2, \ldots \tau_n$ to corresponding radiation pulse sequences 280-1, 280-2, . . . 280-n such that when the modfied radiation pulse sequences 362-1, 362-2, . . . 362-n are combined, the resulting output radiation pulse sequence 104 includes a shifted overlap between at least two of the n modified radiation pulse sequences.

Figure 5D:
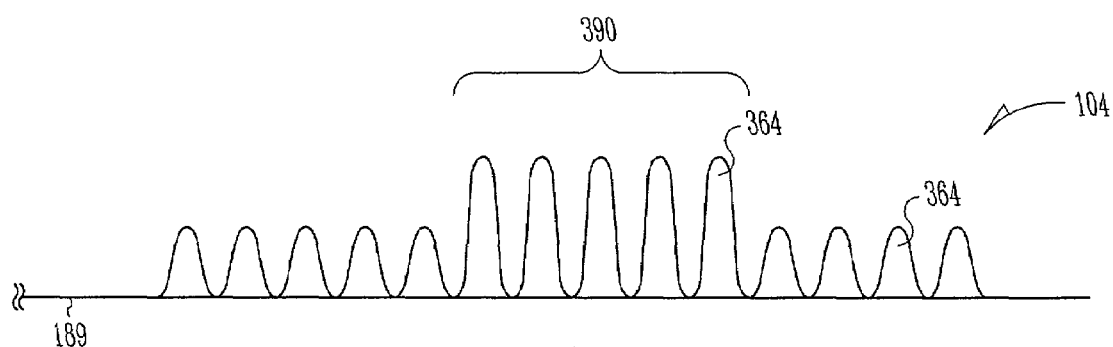
FIG. 5D illustrates an example embodiment of output radiation pulse sequence capable wherein at least a portion of the sequence has a greater pulse amplitude than the remaining portion.

FIG. 5D illustrates an example embodiment wherein output radiation pulse sequence 104 includes at least a portion 390 having a greater pulse amplitude (e.g., double the amplitude) than any single modified radiation pulse sequence 362-1, 362-2, . . . 362-n. This is accomplished, for example, by COE 150 operating to provide time delays $\tau_1, \tau_2, \ldots \tau_n$ that result in an overlap between at least two of the modified radiation pulse sequences.

Single DSTPG Embodiment

Figure 6A:
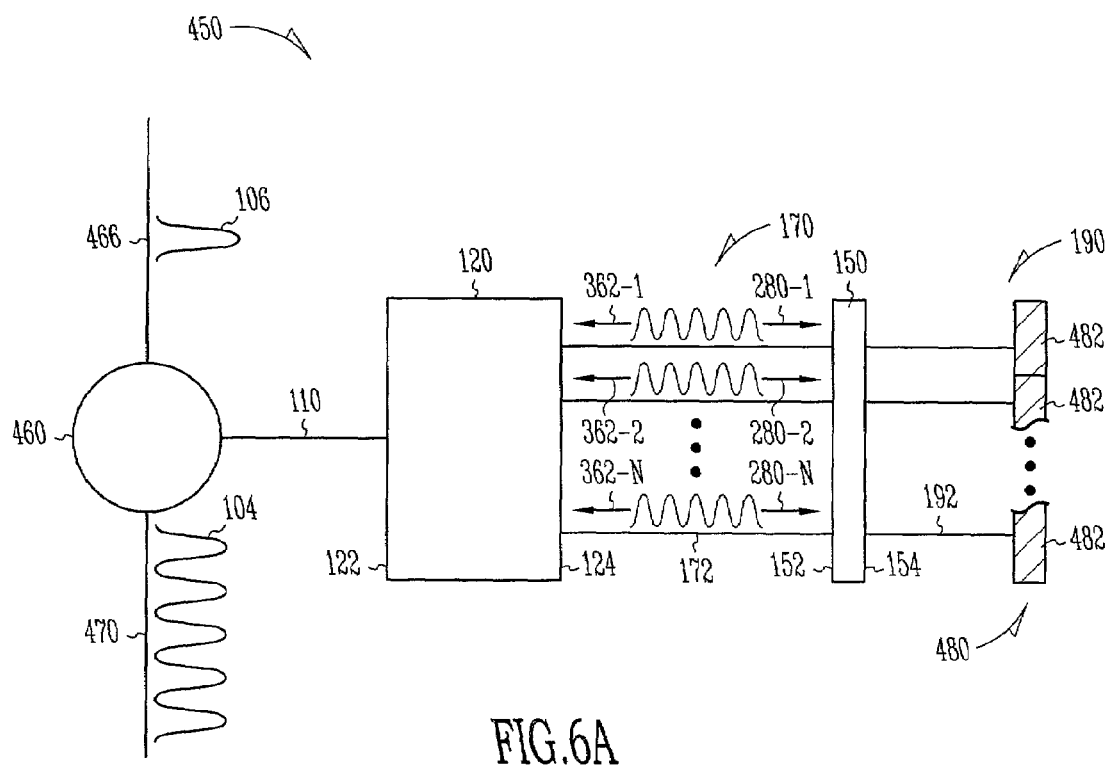
FIG. 6A is a schematic diagram of an example embodiment of the radiation pulse sequence generation apparatus of FIG. 1, wherein the apparatus utilizes a single DSTPG.

FIG. 6A is a schematic diagram of a radiation pulse sequence generation apparatus 450 as example embodiment of apparatus 100 of FIG. 1, but utilizing only a single DSTPG 120. In an example embodiment, apparatus 450 includes input channel (e.g., a waveguide) coupled at one end to DSTPG 120 and at the opposite end to a circulator 460. Also coupled to circular 460 is a circulator input channel 466 and a circulator output channel 470. In apparatus 450, input channel 110 also serves as an output channel, analogous to output channel 189 of apparatus 100 of FIG. 2A.

Waveguide array 190 is coupled at one end to output end 154 of COE 150, as in apparatus 100 of FIG. 2B. However, the other ends of waveguides 192 are coupled to a reflective member 480, such as a mirror. In an example embodiment, reflective member 480 includes a plurality of reflective segments 482 coupled to each waveguide 192.

Figure 6B:
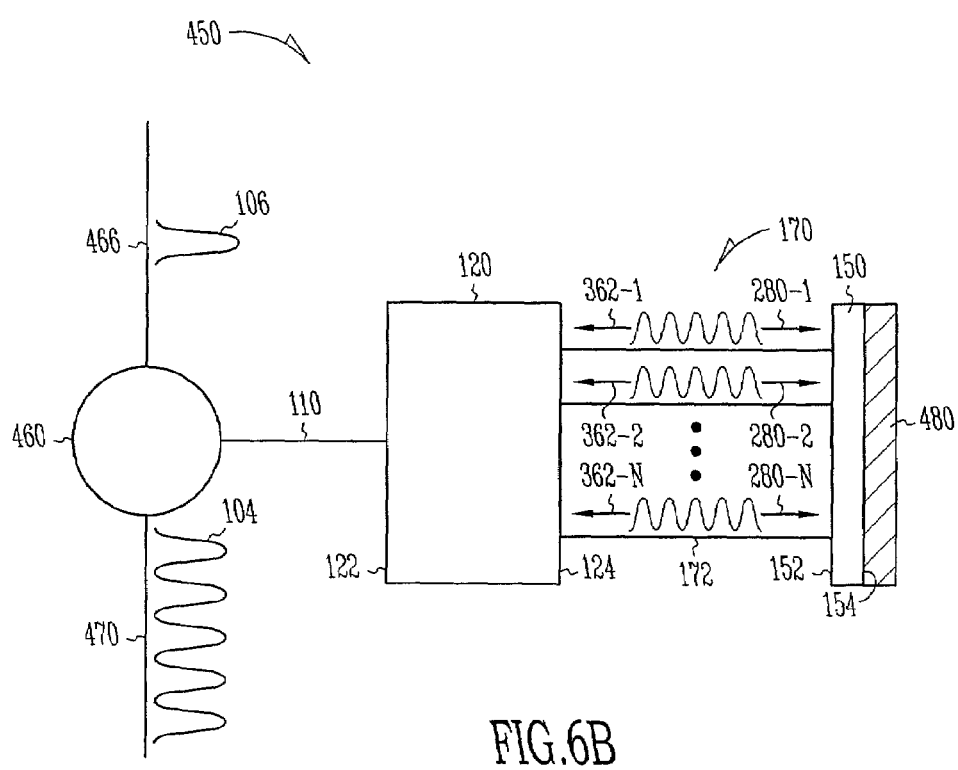
FIG. 6B is a schematic diagram of an example embodiment similar to that of FIG. 6A, wherein the reflective member is arranged immediately adjacent the output end of the COE.

FIG. 6B illustrates an alternative embodiment of apparatus 450, wherein reflective member 480 is arranged immediately adjacent output end 154 of COE 150, thereby eliminating the need for waveguide array 190.

The method of operation of apparatus 450 of FIGS. 6A and 6B is similar to that of apparatus 100 as described above. Radiation pulse sequences 280-1, 280-2, . . . 280-n travel toward COE 150, as indicated by the correspondingly labeled arrow. However, instead of the modified radiation pulse sequences 362-1, 362-2, . . . 362-n passing to another DSTPG, they reflect from reflective member 480 and then pass back through COE 150, back through waveguides 172 (as indicated by the correspondingly labeled arrow), and then back through DSTPG 120. The latter then combines the modified radiation pulse sequences to form output radiation pulse sequence 104.

Also, input pulse 106 traveling in circulator input waveguide 466 is directed to input channel 110 via circulator 460, which also directs output radiation pulse sequence 104 to circulator output channel 470. Thus, the acts of spectrally dispersing input radiation pulse 106 and combining modified radiation pulse sequences 362-1, 362-2, . . . 362-n are performed by the same element, namely DSTPG 120.

Figure 6C:
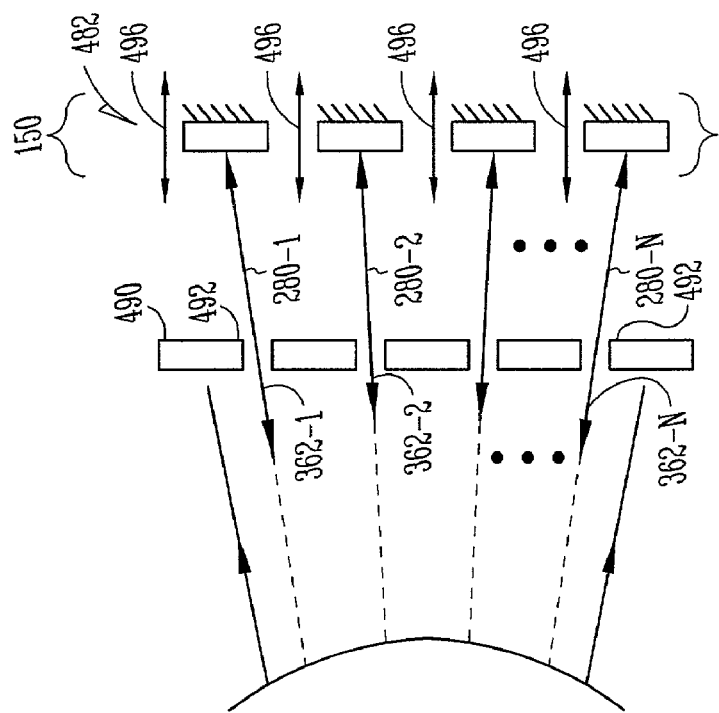
FIG. 6C is a schematic diagram of an example embodiment of the radiation pulse sequence generation of FIG. 6A, wherein the apparatus utilizes bulk optics.
Figure 6C:
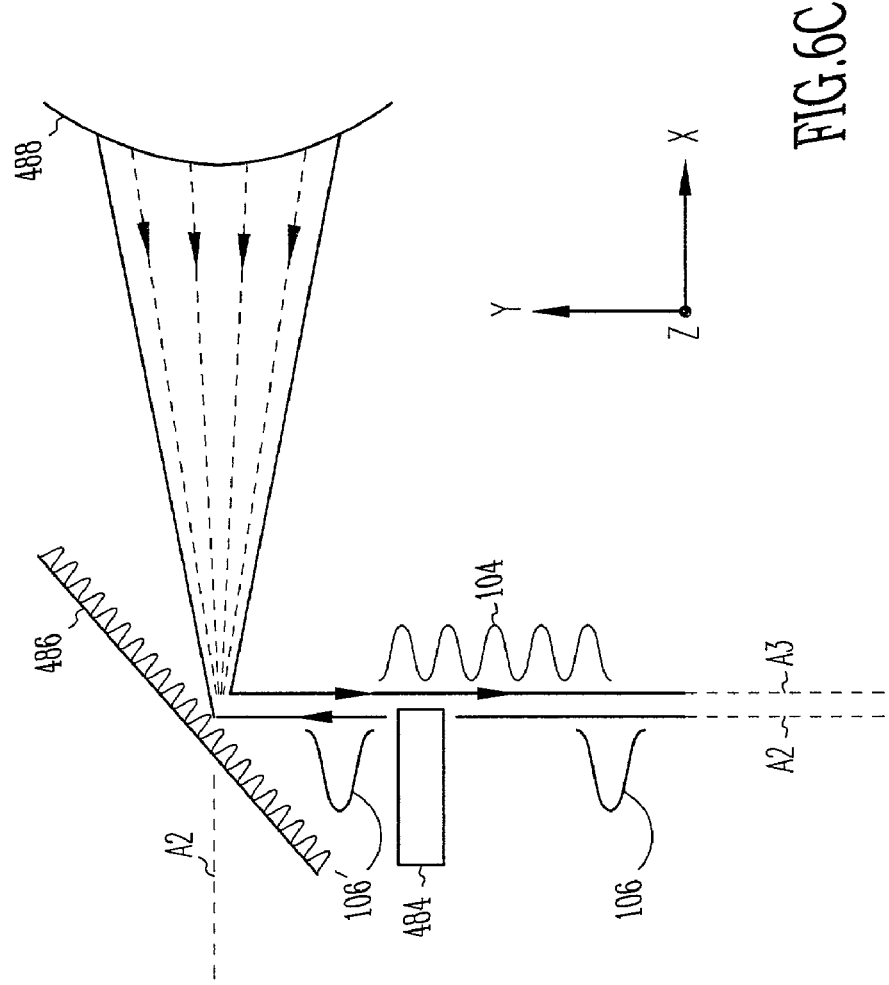

FIG. 6C is a schematic diagram of another example embodiment of the radiation pulse sequence generation apparatus 450 of FIG. 6A, wherein the apparatus utilizes bulk optics. Apparatus 450 of FIG. 6C includes along a folded axis A2 a spatial light modulator 484, a spectral dispersing element (SDE) 486, an optical system 488, an output port 490 with apertures 492, and reflective member segments 482. SDE 486 may be, for example, a diffraction grating, an arrayed waveguide grating (AWG), a virtual image phased array (VIPA), an echelle grating, or any combination thereof.

The operation of apparatus 450 of FIG. 6C is similar to that of the apparatus of FIGS. 6A and 6B. In operation, input pulse 106 is spatially patterned using spatial light modulator 484 to create a spatially patterned radiation pulse 106'. The spatially patterned radiation pulse 106' is then incident on SDE 486 over a first region thereon (not shown) which spectrally disperses the spatially patterned radiation pulse. The spectrally dispersed radiation is collected by optical system 488, and is relayed to output port 490, which samples the radiation via apertures 492 to form radiation pulse sequences 280-1, 280-2, . . . 280-n. The radiation sequences then pass to reflective member segments 482. Segments 482 are formed or are otherwise arranged such that they impart a time delay between the radiation pulse sequences 280-1, 280-2, . . . 280-n, thereby forming modified radiation pulse sequences 362-1, 362-2, . . . 362-n. The reflective member segments 482 may be staggered in the direction of axis A2, or adjusted (e.g., moved) between pulses (as indicated by arrows 496) to create a relative time delay between the optical paths associated with respective apertures 492 and corresponding reflective member segments 482. Thus, in a sense reflective member segments 482 also serve as COE 150 in the apparatus 450 of FIG. 6C.

Modified radiation pulse sequences 362-1, 362-2, . . . 362-n then pass back through optical system 488 and are focused onto a second region (not shown) of dispersive element 486, which combines the modified radiation pulses into a single output radiation pulse sequence 104 directed along an axis A3 displaced from axis A2 along the z-direction, for example.

Apparatus 450 is compact because its optical path is folded. Further, in the apparatus of FIGS. 6A and 6B, the folded optical path allows for a double-pass of radiation through COE 150, so that in an example embodiment COE 150 can have twice the effect, i.e., the modified radiation pulses 362-1, 362-2, . . . 362-n are modified not once but twice because they pass through the COE twice.

Finally, the double-pass nature of apparatus 450 allows the same DSTPG to be used for the dispersing and combining operations, thereby eliminating any undesirable variations in FSR and central wavelength that can arise in systems using two different DSTPGs.

Performance Comparison to Conventional DSTPG

The performance of apparatus 100 and the various embodiments thereof can be compared to that of a single DSTPG by examining the number of output pulses outputted by each, and the associated loss in generating the pulses. The relevant parameters for this comparison are the FSR, the filter passband width ($\delta f$), and number of output ports (N), e.g., the number of waveguides in the waveguide array of an AWG.

Number of Output Pulses

The number of output pulses $P_c$ per output port 172 in a conventional DSTPG is given by:

$$P_C \sim \frac{FSR}{\delta f}$$

In apparatus 100, the number of output pulses $P_N$ per output port 172 is given by:

$$P_N = \sim \frac{FSR}{\delta f} N$$

Note, the maximum number of output ports 170, $$N_{max} \sim \frac{FSR}{\delta f}$$

So, $P_N \sim \left(\frac{FSR}{\delta f}\right)^2$

For example, in a single DSTPG with a FSR=500 GHz, and $\delta f$=20 GHz, the number of pulses in the output radiation pulse sequence 280-1, 280-2, . . . 280-n is ~25. In apparatus 100, with the same FSR and channel width, the number of pulses in the output radiation pulse sequence 104 is ~625. For a continuous sequence of pulses such as illustrated in FIG. 5A, this is equivalent to saying that the temporal window increases from ~50 ps to ~1.250 ns by combining radiation pulse sequences 280-1, 280-2, . . . 280-n.

Low-Loss Operation

Apparatus 100 and the various embodiments thereof also exhibit remarkably low loss. In a conventional DSTPG for a single output channel 172, the throughput $T_c$ is given by:

$$T_C \sim \frac{\delta f}{FSR} \sim \frac{1}{\# \text{ pulses}}$$

Note that most optical apparatus with conventional optical configurations for splitting one pulse into N pulses give a 1/N loss. Fused coupler fiber splitters, multiple beamsplitters, and transversal multimode interference filters are examples of such apparatus.

Apparatus 100, on the other hand, splits one pulse into a large number of pulses with no inherent loss. To understand how apparatus 100 and the various embodiments thereof can operate in this manner, it is useful to consider the channel routing capabilities of a single standard DSTPG.

Figure 7:
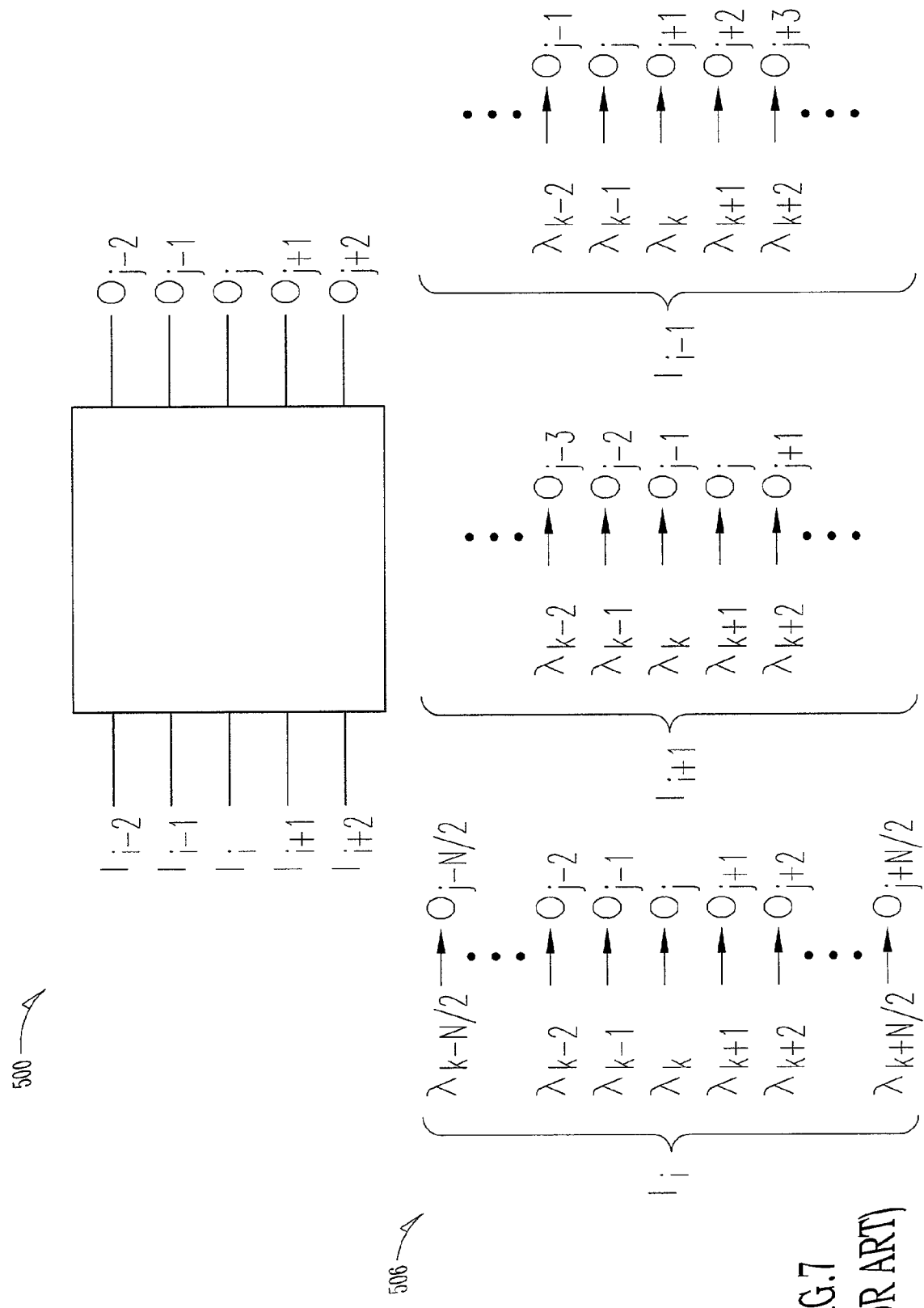
FIG. 7 is a schematic diagram of a prior art DSTPG and the associated wavelength routing table.

FIG. 7 is a schematic diagram of a conventional DSTPG 500 with multiple input waveguides I and multiple output waveguides O, along with a wavelength routing table 506. As one example, DSTPG 500 could be an AWG 10 or AWG 10'. Table 506 indicates which output waveguide O a particular wavelength $\lambda_k$ is routed to as a function of input waveguide I. For example, on input waveguide $I_i$, $\lambda_k$ is output on output waveguide $O_j$ while $\lambda_{k+2}$ is output on $O_{j+2}$. The wavelengths present at a particular output waveguide O repeat with the FSR of the apparatus, so that if $\lambda_k \rightarrow O_j$, then $\lambda_k + m(FSR) \rightarrow O_j$ also.

Based on this understanding of a conventional DSTPG used for channel routing, the operation of apparatus 100 and it various embodiments can be understood by cascading two DSTPGs with the same routing table 506.

Figure 8:
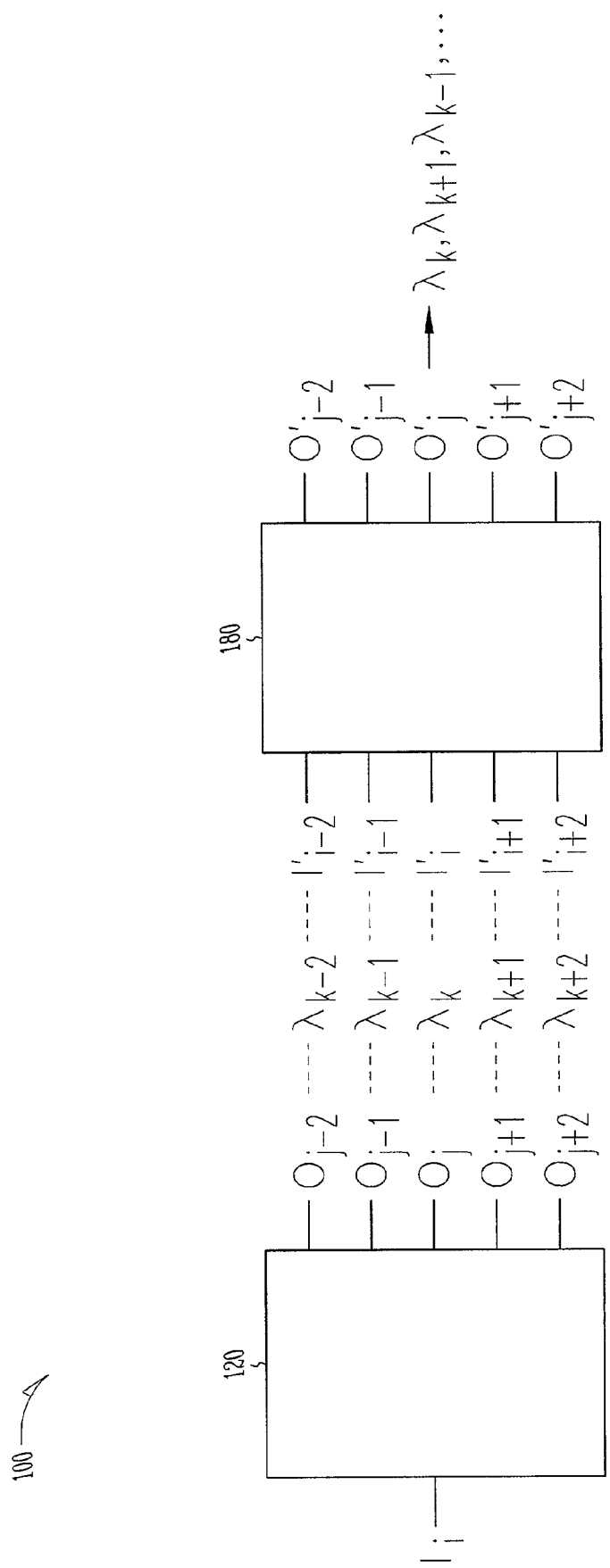
FIG. 8 is a schematic diagram of apparatus 10 along with a wavelength routing table illustrating the cascading of the routing table of FIG. 7 for a radiation pulse sequence generation apparatus utilizing back-to-back DSTPGs and a single input radiation pulse.

FIG. 8 illustrates the cascading of routing table 506 for back-to-back DSTPGs 120 and 180 considering a single input waveguide $I_i$. The wavelength routing character of each output of DSTPG 120 and 180 is shown as a table between the DSTPGs 120 and 180. The input and output waveguides of DSTPG 180 are labeled I' and O'. Using the routing table 506, it can be seen that all the wavelengths $\lambda_k$ separated by DSTPG 120 are recombined by DSTPG 180 into a single output radiation pulses sequence comprising $\lambda_k$, $\lambda_{k+1}$, $\lambda_{k-1}$, . . .

Telecommunication System

Figure 9:
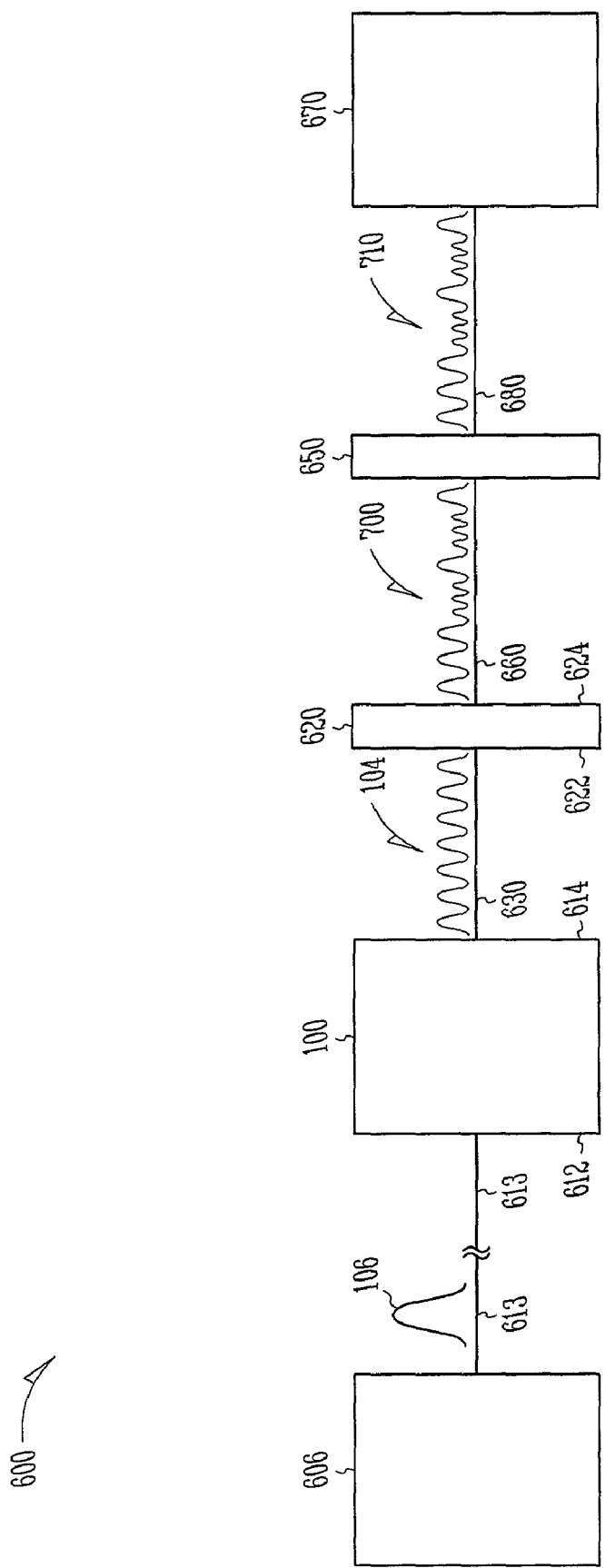
FIG. 9 is a schematic diagram of a telecommunications system that employs the radiation pulse sequence generation apparatus of the present invention.

FIG. 9 is a schematic diagram of a telecommunication system 600 that employs apparatus 100 or one of its various embodiments, as described above. System 600 includes a light source 606 capable of providing individual radiation pulse 106. In an example embodiment, light source 606 is a laser, such as a diode laser or fiber laser. Light source 606 is coupled to radiation pulse sequence generation apparatus 100 at an input end 612 via an input channel 613. Apparatus 100 also has an output end 614

System 600 also includes a modulator 620 with an input end 622 and an output end 624. Input end 622 of modulator 620 is coupled to output end 614 of apparatus 100 via an output optical system (e.g., waveguide) 630. A detector 650 is coupled to output end 624 of modulator 620 via an optical system (e.g., waveguide) 660. An electronic device 670, such as a microprocessor or an electro-optical transmitter, is coupled to detector 650 via an electrical connection (e.g., a wire) 680.

System 600 operates as follows. Light source 606 generates radiation pulse 106, which enters apparatus 100 via input channel 613. Apparatus 100 then creates single output radiation pulse sequence 104 from the single input radiation pulse 106, as described above. Output radiation pulse sequence 104 is then outputted to and carried by output optical system 630. Output radiation pulse sequence 104 then passes to modulator 620, which modulates the output radiation pulse sequence to form a modulated radiation pulse sequence 700. The latter then travels over optical system 660 to detector 650, which receives the modulated radiation pulse sequence 700 and generates a corresponding electrical signal 710. The latter travels over electrical connection 680 and is received by electronic device 670, which then processes the electrical signal.

In the foregoing Detailed Description, various features are grouped together in various example embodiments for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

While the present invention has been described in connection with preferred embodiments, it will be understood that it is not so limited. On the contrary, it is intended to cover all alternatives, modifications and equivalents as may be included within the spirit and scope of the invention as defined in the appended claims.

What is claimed is:

1. An apparatus comprising:
   a first direct space-to-time pulse generator (DSTPG) capable of receiving an input radiation pulse and forming therefrom a multitude of spatially separated radiation pulse sequences;
   a channel operation element (COE) coupled to the first DSTPG to receive the multitude of radiation pulse sequences and adapted to perform an operation on one or more of the multitude of radiation pulse sequences to form corresponding modified radiation pulse sequences; and
   a second DSTPG coupled to the COE and capable of receiving and combing the modified radiation pulse sequences to form a single output radiation pulse sequence.

2. The apparatus of claim 1, further including:
   a first optical system between the first DSTPG and the COE; and
   a second optical system between the second DSTPG and the COE.

3. The apparatus of claim 2, wherein:
   the first optical system includes a first set of waveguides coupled to an output end of the first DSTPG and to an input end of the COE; and
   the second optical system includes a second set of waveguides coupled to an input end of the second DSTPG and to an output end of the COE.

4. The apparatus of claim 1, further including:
   an input channel coupled to an input end of the first DSTPG; and
   an output channel coupled to an output end of the second DSTPG.

5. The apparatus of claim 4, wherein the input and output channels each include a waveguide.

6. The apparatus of claim 1, wherein at least one of the first and second DSTPGs includes an arrayed waveguide grating (AWG).

7. The apparatus of claim 6, wherein at least one of the AWGs includes waveguide operation elements (WOEs).

8. The apparatus of claim 1, wherein at least one of the fist and second DSTPGs includes at leas one of a diffraction grating, a viral image phased array (VIPA), and an echelle grating.

9. The apparatus of claim 1, wherein the first and second DSTPGs and the COE are formed as a planar lightwave circuit (PLC) on a substrate.

10. The apparatus of claim 1, wherein the COE is programmable.

11. The apparatus of claim 10, further including a controller operably connected to the COE.

12. The apparatus of claim 1, wherein the COE is capable of performing at least one of the following operations:
   a) imparting a relative time delay between one or more of the multitude of radiation pulse sequences;
   b) attenuating one or more of the multitude of radiation pulse sequences;
   c) modifying the polarization state of one or more of the multitude of radiation pulse sequences;
   d) modulating one or more of the multitude of radiation pulse sequences;
   e) amplifying one or more of the multitude of radiation pulse sequences; and
   f) imparting a phase shift to one or more of the multitude of radiation pulse sequences.

13. The apparatus of claim 1, wherein the first and second DSTPGs have the same or substantially the same free spectral range (FSR) and central wavelength.

14. An apparatus comprising:
   a direct space-to-tie pulse generator (DSTPG) capable of receiving an input radiation pulse and forming therefrom a multitude of spatially separated radiation pulse sequences;
   a channel operation element (COE) coupled to the DSTPG to receive the multitude of radiation pulse sequences and adapted to operate on one or more of the multitude of radiation pulse sequences to form corresponding modified radiation pulse sequences; and
   a reflective member coupled to the COE element and adapted to reflect the modified radiation pulse sequences back though the DSTPG to form a single output radiation pulse sequence.

15. The apparatus of claim 14, further including:
   a circulator coupled to an input end of the DSTPG;
   input and output channels coupled to the circulator; and wherein the circulator is adapted to direct radiation traveling in the input channel to the DSTPG, and to direct the single output radiation pulse sequence to the output channel.

16. The apparatus of claim 14, wherein the DSTPG includes at least one of a diffraction grating, an arrayed waveguide grating (A WG), a vial image phased array (VIP A), and an echelle grating.

17. The apparatus of claim 16, wherein the DSTPG includes an AWG having waveguide operation elements (WOEs).

18. The apparatus of claim 14, wherein the reflective member is arranged immediately adjacent the COE.

19. An apparatus comprising:
a dispersive element arranged to receive and spectrally disperse an input radiation pulse;
an optical system adjacent the dispersive element for collecting and relaying the spectrally dispersed radiation pulse;
an output port with multiple apertures arranged adjacent the optical system to receive the relayed spectrally dispersed radiation pulse and pass select portions thereof though the multiple apertures to form a corresponding multitude of radiation pulse sequences;
reflective elements arranged adjacent the multiple apertures to reflect each radiation pulse sequence and to impart thereto a select time delay so as to form corresponding modified radiation pulse sequences, the reflective elements so arranged to direct the modified radiation pulse sequences back through the output port, the optical system, and to the dispersive element such that the modified radiation pulse sequences are combined to form a single output radiation pulse sequence.

20. The apparatus of claim 19, wherein the dispersive element includes at least one of a diffraction grating, a vial image phased array (VIP A), and an echelle grating.

21. A system comprising:
a light source capable of providing an input pulse of radiation;
a radiation pulse sequence generator coupled to the light source, the radiation pulse sequence generator comprising fist and second direct space-to-time pulse generators (DSTPG) coupled to one another though a channel operation element (COE) and adapted to generate a single output radiation pulse sequence in response to the input pulse of radiation.

22. The system of claim 21, further comprising:
a modulator coupled to the radiation pulse sequence generator and adapted to form a modulated radiation pulse sequence from the single output radiation pulse sequence.

23. The system of claim 22, further comprising:
a detector coupled to the modulator and adapted to produce an electrical signal in response to detecting the modulated radiation pulse sequence.

24. The system of claim 23, further including an electronic device coupled to the detector and capable of processing the electrical signal.

25. A method comprising:
spectrally dispersing a single radiation pulse, thereby forming a multitude of spatially separated radiation pulse sequences;
performing an operation on at least one of the multitude of radiation pulse sequences to form a corresponding multitude of modified radiation pulse sequences; and
forming an output radiation pulse sequence by spectrally combining the modified radiation pulse sequences.

26. The method of claim 25, wherein spectrally dispersing the single radiation pulse includes passing the radiation pulse though at least one of a diffraction grating, an arrayed waveguide grating (A WG), a vial image phased array (VIPA), and an echelle grating.

27. The method of claim 25, wherein spectrally dispersing the single radiation pulse is accomplished by passing the single radiation pulse though an AWG and operating on the spectrally dispersed radiation pulse with waveguide operation elements (WOEs) in the AWG.

28. The method of claim 25, wherein spectrally combining the single radiation pulse includes passing the radiation pulse though at least one of a diffraction grating, an arrayed waveguide grating (AWG), a vial image phased array (VIPA), and an echelle grating.

29. The method of claim 25, including performing the acts of spectrally dispersing and spectrally combining with a common direct space-to-time pulse generator (DSTPG).

30. The method of claim 25 further including the act of reflecting the modified radiation pulse sequences.

31. The method of claim 25, further including modulating the output radiation pulse sequence to form a modulated radiation pulse sequence.

32. The method of claim 31, including detecting the modulated radiation pulse sequence and generating a corresponding electrical signal.

33. A method comprising:
providing a single radiation pulse;
dispersing the single radiation pulse to form a multitude of spatially separated radiation pulse sequences;
operating on at least one of the multitude of spatially separated radiation pulse sequences to form a corresponding multitude of modified radiation pulse sequences; and
combing the modified radiation pulse sequences to form a single output radiation pulse sequence.

34. The method of claim 33, wherein the operating on the at least one of the spatially separated radiation pulse sequences includes imparting a time delay to one or more of the spatially separated radiation pulse sequences.

35. The method of claim 33, wherein the input radiation pulse has a temporal pulse width, and the impaired time delay is equal to or greater than the input temporal pulse width.

36. The method of claim 33, wherein the spatially separated radiation pulse sequences each have a sequence temporal pulse duration, and the impaired time delay is equal to or greater than the sequence temporal pulse duration.

37. The method of claim 33, wherein imparting the time delay includes passing the radiation pulse sequences through corresponding waveguides each having a different length.

38. The method of claim 33, including forming the output radiation pulse sequence to be continuous.

39. The method of claim 33, including forming the output radiation pulse sequence to have at least one gap.

40. The method of claim 33, including forming the output radiation pulse sequence to have at least a portion with a higher pulse rate than that of the modified radiation pulse sequences.

41. The method of claim 33, wherein the output radiation pulse sequence includes at least a portion having a modified pulse amplitude relative to that in the radiation pulse sequences.

* * * * *

UNITED STATES PATENT AND TRADEMARK OFFICE
CERTIFICATE OF CORRECTION

PATENT NO.         : 7,142,789 B1                                    Page 1 of 2
APPLICATION NO. : 10/188293
DATED              : November 28, 2006
INVENTOR(S)       : Weiner et al.

It is certified that error appears in the above-identified patent and that said Letters Patent is hereby corrected as shown below:

On the Title page, in item (56), under "U.S. Patent Documents", in column 1, line 4, after "6,608,945" delete "B1" and insert -- B2 --, therefor.

Column 12, line 21, in Claim 8, delete "fist" and insert -- first --, therefor.

Column 12, line 22, in Claim 8, delete "leas" and insert -- least --, therefor.

Column 12, line 23, in Claim 8, delete "viral" and insert -- virtual --, therefor.

Column 12, line 51, in Claim 14, delete "tie" and insert -- time --, therefor.

Column 12, line 63, in Claim 14, delete "though" and insert -- through --, therefor.

Column 13, line 7, in Claim 16, delete "(A WG)" and insert -- (AWG) --, therefor.

Column 13, line 7, in Claim 16, delete "vial" and insert -- virtual --, therefor.

Column 13, lines 7-8, in Claim 16, delete "(VIP A)" and insert -- (VIPA) --, therefor.

Column 13, line 23, in Claim 19, delete "though" and insert -- through --, therefor.

Column 13, line 35, in Claim 20, delete "vial" and insert -- virtual --, therefor.

Column 13, line 36, in Claim 20, delete "(VIP A)" and insert -- (VIPA) --, therefor.

Column 13, line 42, in Claim 21, delete "fist" and insert -- first --, therefor.

Column 13, line 43, in Claim 21, delete "though" and insert -- through --, therefor.

Column 14, line 3, in Claim 26, delete "though" and insert -- through --, therefor.

Column 14, line 4, in Claim 26, delete "(A WG)" and insert -- (AWG) --, therefor.

Column 14, line 4, in Claim 26, delete "vial" and insert -- virtual --, therefor.

Column 14, line 8, in Claim 27, delete "though" and insert -- through --, therefor.

Column 14, line 13, in Claim 28, delete "though" and insert -- through --, therefor.

Column 14, line 14, in Claim 28, delete "vial" and insert -- virtual --, therefor.

UNITED STATES PATENT AND TRADEMARK OFFICE
CERTIFICATE OF CORRECTION

PATENT NO. : 7,142,789 B1
APPLICATION NO. : 10/188293
DATED : November 28, 2006
INVENTOR(S) : Weiner et al.

It is certified that error appears in the above-identified patent and that said Letters Patent is hereby corrected as shown below:

Column 14, line 36, in Claim 33, delete "combing" and insert -- combining --, therefor.

Column 14, line 43, in Claim 35, delete "impaired" and insert -- imparted --, therefor.

Column 14, line 49, in Claim 36, delete "impaired" and insert -- imparted --, therefor.

Signed and Sealed this

Twenty-seventh Day of March, 2007

JON W. DUDAS
*Director of the United States Patent and Trademark Office*